July 15, 1958 W. W. MOUNT 2,843,536
SOLAR STILL WITH MEANS TO CLEAN EVAPORATOR SURFACE
Filed May 10, 1952 2 Sheets-Sheet 2
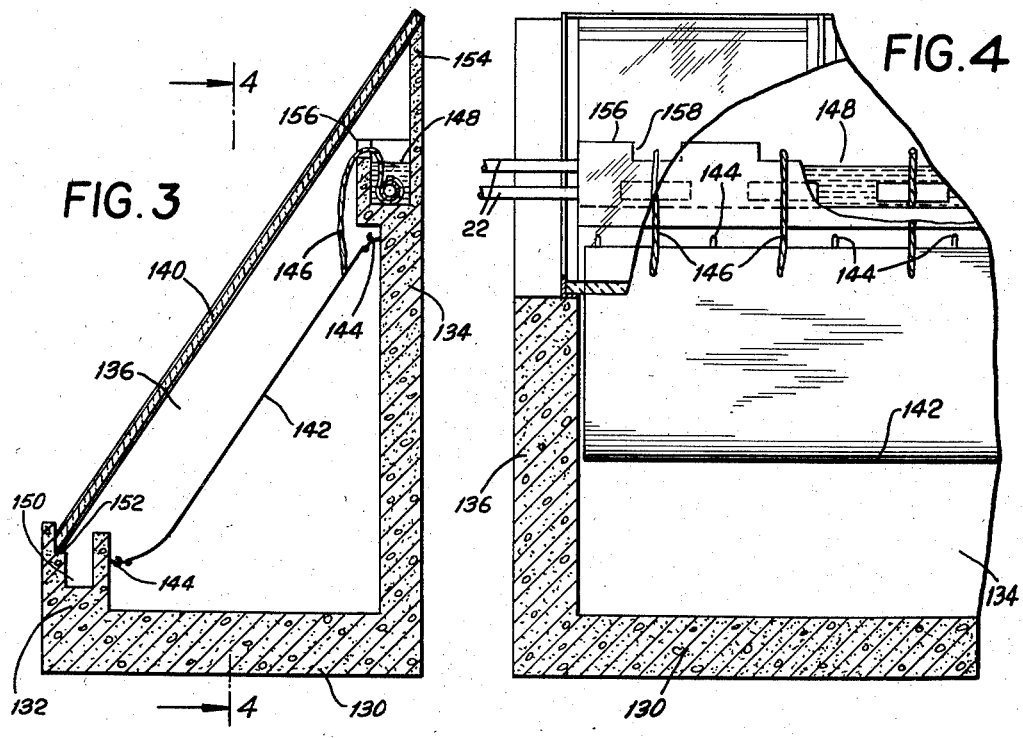
INVENTOR.
WADSWORTH W. MOUNT
BY
ATTORNEYS

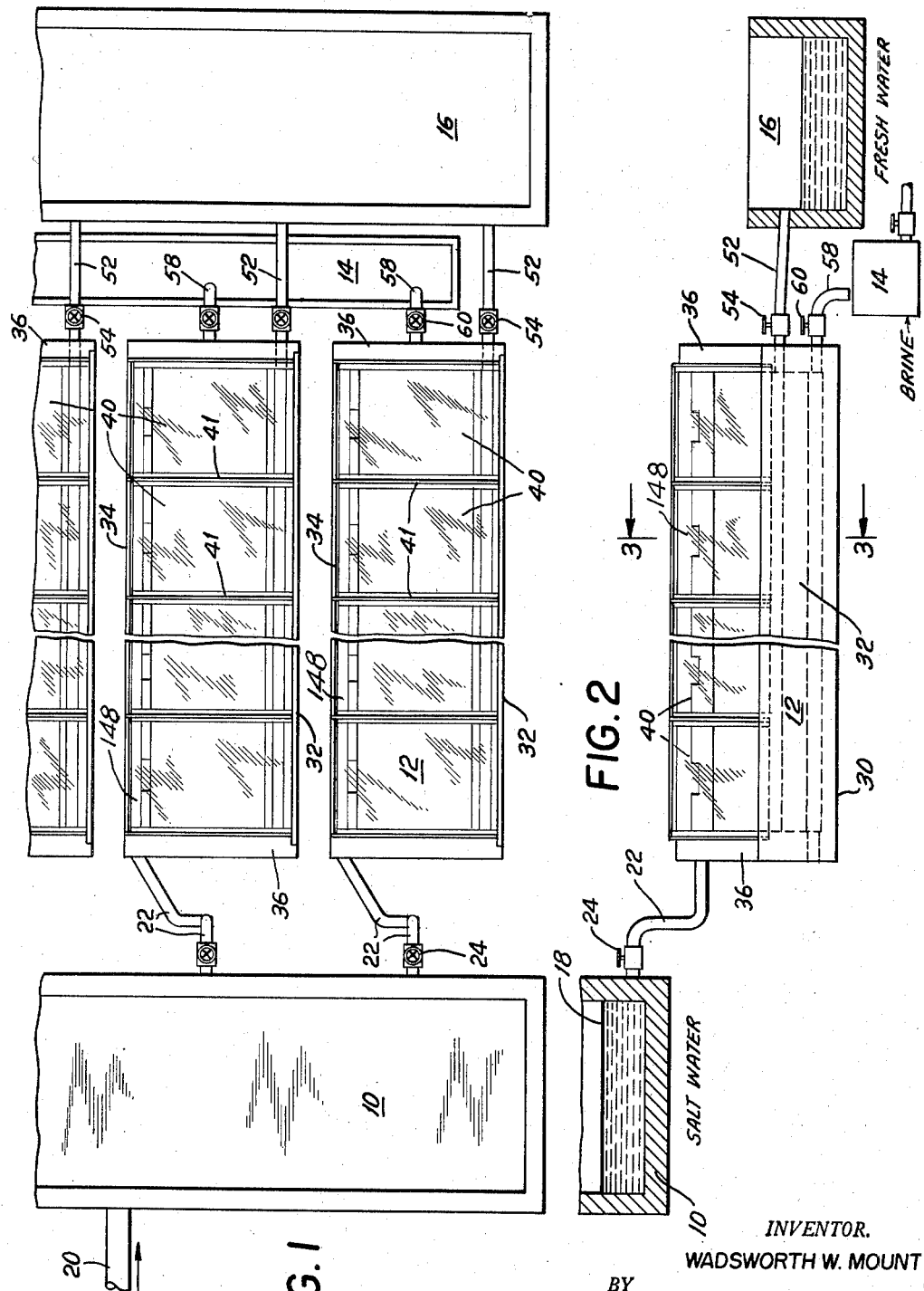

United States Patent Office 2,843,536
Patented July 15, 1958

2,843,536

SOLAR STILL WITH MEANS TO CLEAN EVAPORATOR SURFACE

Wadsworth W. Mount, Chatham, N. J., assignor of nine and eight-tenths percent to each of the following: James L. Buckley, Aloise B. Heath, John W. Buckley, Priscilla L. Buckley, Jane B. Smith, William F. Buckley, Jr., Patricia B. Bozwell, Fergus R. Buckley, Maureen Buckley, and Connecticut Bank & Trust Co., guardian of the estate of Carol Buckley, and a two percent interest to C. Dean Reasoner Application May 10, 1952, Serial No. 287,101

2 Claims. (Cl. 202—234)

The present invention relates to new and useful improvements in the solar distillation of sea water and the like to produce fresh or relatively pure water.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate two embodiments of the invention, and together with the description, serve to explain the principles of the invention.

Of the drawings:

Figure 1 is a fragmentary top plan view showing one embodiment of the present invention;

Figure 2 is a side elevtion, partly in section, of the embodiment shown in Figure 1;

Figure 3 is a vertical sectional view showing a modified embodiment of the invention; and Figure 4 is a sectional view taken on the line 4—4 of Figure 3.

The present invention has for its object the provision of a novel and improved solar distillation apparatus for the distillation of fresh, potable water from sea water, brackish or otherwise contaminated water. A further object is the provision of a novel and improved apparatus of this kind which is relatively simple and economical in its construction, and can be operated for long periods of time without requiring the expenditure of excessive labor, and which is especially adapted for large scale application. A further object is the provision of apparatus of this kind which can be easily washed to free the apparatus from the excessive accumulations of salt which result from continued operation of the apparatus and otherwise gradually interfere with its efficient operation. The apparatus is particularly adapted to be constructed of durable, and relatively inexpensive materials of construction, and thus can be constructed for relatively small cost and for the distillation of whatever quantities of water are to be treated.

The present invention provides an efficient apparatus which is adapted to be supplied with a quantity of water contaminated with salts or other impurities, and to hold this quantity of water in a water-tight and substantially air-tight vessel while the water is fed in a thin layer over a large area and is exposed to the rays of the sun to heat the water and cause it to evaporate, the water vapor then condensing on a relatively cooler surface from which it drains by gravity into a collecting drain by which it is removed from the vessel and may be conveyed to a tank or other storage receptacle. Means are provided for spreading the water to be heated as a thin layer and preferably comprise a sheet of capillary material, such as black cotton cloth, to which the water is slowly fed by capillarity, either from a water reservoir above or below the sheet. Other means are provided for rinsing the sheet with fresh quantities of the impure water from time to time, and preferably at night or during times when the sun is obscured, so that any deposits of salt on the sheet are reduced or removed before they seriously interfere with the operation of the still. In one form, the sheet is positioned and the vessel is so formed that the level of the salt water may be raised to the level where the sheet is submerged in the salt water used for rinsing, while in another form, the sheet is normally fed from above through capillary wicks, and when it is desired to rinse the excess accumulations of salt from it, the salt water is allowed to overflow from the feed trough, thereby allowing the rinsing water to dissolve out the salts as it flows downwardly over the sheet and into the salt water drain portion of the vessel.

The feed water is preferably stored in a reservoir having a relatively large area and is covered with a supernatant layer of radiation absorbing, immiscible material, such as black oil, so that it may be preheated by solar radiation, and is fed from the reservoir as needed to the several solar stills.

In actual practice, the apparatus may be spread over large areas, such as several acres, comprising one or more large reservoirs for preheating the water, and a relatively large number of interconnected distillation units, from which the fresh water is collected into fresh water reservoirs, while the partially distilled salt feed water is drained off, and would ordinarily be returned to the sea or used as a source of concentrated brine.

It will be understood that the foregoing general description and the following detailed description as well are exemplary and explanatory of the invention but are not restrictive thereof.

Referring now in detail to the present preferred and illustrative embodiment of the present invention as shown in Figures 1 to 4 of the accompanying drawings, there is provided a large reservoir 10, which is connected by piping to feed by gravity to a plurality of distillation units 12, from which the salt water is drained into one or more waste tanks 14, while the fresh or salt-free water is drained into and collected in the fresh water tank 16.

The brine reservoir 10 preferably comprises a shallow tank which is supplied with salt water, brine or other water to be purified from the sea or other source through a pipe 20, the water being pumped into the reservoir 10 at such a rate that a substantially constant level is maintained. In actual practice, the water in the tank 10 is preferably about 6 inches deep and should not exceed one or two feet in depth. The tank 10 is preferably constructed of durable waterproof material such as concrete or resistant wood, such as cypress, and may have an area of as much as a few acres.

Preferably, and for the efficient preheating of the water in the tank 10, there is provided on the surface of the water a thin layer of a heat absorptive material 18 which is immiscible with the water and which does not contaminate the water. This material is preferably a liquid and is chosen so as to have a high degree of absorption for solar radiation. For this purpose, a dark heavy petroleum oil, soft still pitch or asphaltum is suitable, and is preferably used in a layer not exceeding ¼ inch in thickness. Such material forms a thin supernatant layer which is in intimate thermal contact with the body of water and transfers its absorbed heat directly to the water with a minimum of loss. Floating sheets of dark or black material, such as blackened metal pans may also be used.

The preheated water is fed from the brine tank 10 through distribution pipes 22 to the individual distillation units 12, the gravitational flow of the water being regulated by means of the valves 24, so that the rate of feed is normally two to four or five times or only slightly in excess of the rate at which the water is distilled by the distillation units. An excessive rate of water feed from the tank 10 to the distillation units 12 results in a correspondingly lowered efficiency of the distillation units due to the heat lost by the effluent water.

Figures 3 and 4 illustrate in detail the preferred form of the distillation unit 12 shown in Figures 1 and 2. As embodied, the unit comprises a water-tight and substantially air-tight trough-like container formed from concrete, resistant wood or other suitable constructional material and preferably relatively narrow and long. In actual practice, the distillation units would be two or only a few feet wide, and may be extended as far as practical considering the necessity for insuring gravitational flow of the water contained in them, and at the same time avoiding excessive depths of water at any portion of the apparatus. The units are accurately oriented and extend lengthwise in an easterly and westerly direction so as to receive a maximum of solar radiation.

In operation, the brine feed reservoir 10 is filled sufficiently with sea water and preferably covered with the supernatant layer of heat absorptive material 18. Valve 24 is then opened to a slight extent, valve 54 is preferably opened fully, and valve 60 is opened to permit a restricted flow somewhat less than that permitted by the valve 24. Water is then fed to the tank 10 at a rate such that the level of the water in the tank 10 is maintained substantially constant.

Under these conditions and during the sunny hours of the day, the water in the tank 10 is preheated by the solar radiation and this preheated water is continuously fed to the narrow supply troughs 148 where is it picked up by the wicks 146 and fed by capillarity to and completely over the sheet 142 which acts as a radiation absorber and water evaporator. The general inclination of the sheet 142 is such that it receives the maximum amount of solar radiation throughout the day. For this purpose, the inclination of the sheet 142 with respect to the earth is slightly more than the latitude of the location; that is, it is inclined somewhat more than is required for it to be normal to the sun's rays at noon at the summer solstice, and the sheet 142 and the troughs 148 extend in a generally easterly and westerly direction.

In this position, the salt water supported by the black evaporator sheet 142 is rapidly heated by the sun's rays, even on cloudy days, often being heated as much as 70° or 80° F. above the ambient temperature, and thereby greatly increasing the vapor pressure of the water vapor in the body of air contained within the distillation unit 12. The glass or other transparent member 140 being exposed to the external air on its upper surface tends to assume the ambient temperature although it is heated on its lower surface by the mass of air within the distillation unit 12. However, it does prevent excessive heat loss from within the unit 12 while maintaining itself as the colder surface so that it acts as both a radiation transmitting member and as a condenser surface on which the distilled water collects as the vapor-laden air within the unit impinges on its under surface. As the sheet 142 is spaced from the inner walls 132 and 134, air can circulate with considerable freedom within the unit 12, and the temperature differential between the sheet 142 and the condenser 140 causes a thermal current of the air which increases the rate of air circulation, and thereby increases both the rate of evaporation from the evaporator sheet 142 as well as the rate of flow past the condenser surface of sheet 140, thereby increasing the rate of distillation of the water.

The useful distillation of water from the fed salt water continues long after sundown, due to the temperature of the preheated water in tank 10, the heat capacity of the distillation unit, and the usual reduction in the ambient temperature consequent upon the setting of the sun.

When the useful distillation of water has ceased for the day, one or more hours after sundown, or whenever necessary, the accumulated salts on the evaporator sheets 42 may be disposed of and kept from accumulating to the extent where they interfere with efficient operation of the distillation unit.

The apparatus is then ready to be recharged and its valves 24, 54 and 60 set for the next day's operation when the sun rises. With proper regulation of the rate of salt water fed to and from the distillation units 12, the apparatus is entirely automatic during its distillation operation, and additionally needs only a daily or more or less frequent rinsing to maintain it in efficient operation over long periods of time.

Figures 3 and 4 of the drawings illustrate a modified embodiment of the present invention which is preferred for use in more northerly latitudes. In this embodiment, the distillation unit comprises a bottom wall member 130, a southerly wall member 132 which is usually very low, a higher northerly wall member 134 and end walls 136.

The southerly wall 132 is formed with a drain channel 150 having a shoulder 152 on which the lower edge of the glass sheet or condenser 140 rests, while the upper edge of the northerly wall is provided with a salt water supply channel 148 which is supplied with salt water from one of the distribution pipes 22. The northerly edge 154 of the channel 148 is raised and forms a support for the upper edge of the condenser sheet 140, while the southerly edge 156 is notched along its length, as at 158, so as to distribute the salt water as it overflows from the channel 148 when the level of the salt water is sufficiently raised in the channel.

The evaporator sheet 142 is supported within the distillation unit and preferably so as to be easily removable from the supporting hooks 144 which are fixed in the inner sides of the walls 132 and 134, supporting the sheet 142 at the proper inclination with respect to the sun. The upper edge of the sheet 142 is preferably supported under the lower edge of the wall 156 so that as salt water overflows from the channel 148 it drains onto the sheet 142 and flows down over the sheet and into the bottom portion of the distillation unit, from which it is collected and carried away through a drain pipe 58.

Means are also provided for supplying the evaporator sheet 142 with a continuous slow flow of salt water, slightly in excess of the amount distilled by the action of the sun's rays, and for this purpose spaced wicks 146 are provided along the length of the sheet 142 and have one end immersed in the salt water in channel 148, while each has its other end suitably attached to the upper portion of the sheet 142, the spaced wicks being sufficiently close together so that the entire surface of the evaporator sheet is maintained wet with salt water by capillary flow from the channel 148 through the wicks 146 and the capillarity of the cloth of which the sheet 142 is made.

In operation the channel 148 is maintained filled with salt water just below the level of the notches 158, and a sufficient number of sufficiently absorptive wicks 146 are provided to maintain a constant flow of salt water over the sheet 142. The distilled water condensed on the under surface of the condenser sheet 140 drains into the channel 150 and from there to one end of the distillation unit where it flows out through the fresh water pipe 52 to the reservoir 16, while excess salt water flows down top of 130 through discharge pipe 58 into waste tank 14.

During the non-distillation period, the supply valve 24 is opened wider to allow the salt water to feed more freely into the channel 148 and it overflows the channel 148 through the notches 158 so as to wash over the surface of the evaporator 142, thereby rinsing away any accumulated deposits of salt.

The invention in its broader aspects is not limited to the specific mechanisms shown and described but departures may be made therefrom within the scope of the accompanying claims without departing from the principles of the invention and without sacrificing its chief advantages.

What is claimed is:

1. Solar distillation apparatus including in combination an air-tight housing having a transparent condenser surface forming the upper wall of the housing, an inclined light absorbing capillary sheet mounted within the housing receiving light through said condenser surface and forming an evaporator surface, supply means for feeding salt water to the evaporator and over said evaporator to outlet means through which used salt water may flow from the housing, said supply means comprising a salt water supply trough in the upper part of the housing and extending over the edge of said capillary sheet so that overflow from said supply trough rinses the sheet, capillary wicks feeding salt water from said supply trough to the capillary sheet, means to collect condensed water from said condenser surface, an outlet from the collecting means separated from the salt water outlet means, means for raising the level of the salt water in said supply trough to overflow the supply means for washing the evaporator surface to remove accumulated salt deposits therefrom and a barrier separating the condensed water outlet means from the salt wash water, said barrier having its upper edge above the lower end of the inclined sheet and preventing access of salt water to the condensed water as the salt water level is raised to wash the entire evaporator surface.

2. Solar distillation apparatus as claimed in claim 1 in which the supply trough is downwardly notched and the wicks are positioned in the notches, so that raising the level of the salt water in the supply trough causes salt water to flow through the notches and onto the capillary sheet.

References Cited in the file of this patent

UNITED STATES PATENTS

| 102,633 | Wheeler | May 3, 1870 |
| 1,812,516 | Dooley | June 30, 1931 |
| 2,383,234 | Barnes | Aug. 21, 1945 |
| 2,405,877 | Delano | Apr. 13, 1946 |
| 2,490,659 | Snyder | Dec. 6, 1949 |

FOREIGN PATENTS

| 681,133 | France | Jan. 27, 1930 |
| 840,633 | France | May 3, 1939 |

OTHER REFERENCES

Institution of Civil Engineers Proceedings, vol. 73, February to April 1883, pages 284 to 288.